(12) United States Patent
Chatterjee et al.

(10) Patent No.: US 6,996,689 B2
(45) Date of Patent: Feb. 7, 2006

(54) SYSTEMS AND METHODS FOR STRIPED STORAGE MIGRATION

(75) Inventors: Paresh Chatterjee, Fremont, CA (US); Sumanesh Samanta, Fremont, CA (US); Basavaraj Hallyal, Fremont, CA (US)

(73) Assignee: LSI Logic Corporation, Milpitas, CA (US)

( * ) Notice: Subject to any disclaimer, the term of this patent is extended or adjusted under 35 U.S.C. 154(b) by 306 days.

(21) Appl. No.: 10/417,366

(22) Filed: Apr. 16, 2003

(65) Prior Publication Data

US 2004/0210731 A1    Oct. 21, 2004

(51) Int. Cl.
*G06F 12/00*    (2006.01)
(52) U.S. Cl. .................. 711/162; 711/165; 711/144; 714/5
(58) Field of Classification Search ............... 711/112, 711/114, 148, 161, 162, 165; 714/5, 6, 8, 714/42, 43, 56; 709/238, 240, 242, 213, 709/214, 215, 216
See application file for complete search history.

(56) References Cited

U.S. PATENT DOCUMENTS

| 6,446,223 | B1 * | 9/2002 | Morishita et al. | 714/47 |
| 6,598,174 | B1 * | 7/2003 | Parks et al. | 714/6 |
| 6,647,460 | B2 * | 11/2003 | Kodama | 711/114 |
| 6,851,020 | B2 * | 2/2005 | Matsumoto et al. | 711/112 |
| 2003/0014584 | A1 * | 1/2003 | Kodama | 711/112 |

* cited by examiner

*Primary Examiner*—Brian R. Peugh
(74) *Attorney, Agent, or Firm*—Duft Bornsen & Fishman, LLP (57) ABSTRACT

Systems and methods for expanding capacity of a storage system are provided. Data blocks of a capacity increasing disk are pre-configured with a first progress indicator used to determine correctly migrated data blocks. A migrator migrates groups of data blocks among present disk(s) and capacity increasing disk(s). Each group comprises a predetermined number of data blocks. An updater updates a second progress indicator of the second disk in response to completion of migration of each group. The migrator is adapted to generate the first progress indicator such that it may resume migration of groups of data blocks after a migration interruption according to the first and the second progress indicators.

14 Claims, 5 Drawing Sheets

SYSTEMS AND METHODS FOR STRIPED STORAGE MIGRATION

BACKGROUND OF THE INVENTION

1. Field of the Invention

The invention relates to migration of data in storage systems. More specifically, the invention relates to migration of data blocks, or stripes, on disks of a storage system onto newly implemented disks used to increase capacity in the storage system.

2. Discussion of the Related Art

High Performance storage systems typically include multiple hard disk drives ("disks") and storage management to provide improved storage performance and fault tolerance. Performance and fault tolerance of storage exist on many levels. One method of improving performance includes "striping" data on the disks such that the stripes are spread across multiple disks. An example of one such storage system that provides striping is a RAID Level 0 ("RAID0"). Fault tolerance can be achieved in the storage system by employing storage management to include redundant information, such as RAID storage management. Examples of RAID storage management include RAID Level 1 ("RAID1") which mirrors data on a first drive to a second drive, RAID Level 3 ("RAID3") which provides data striping with one disk reserved for error correction, and RAID Level 5 ("RAID5") which provides data striping and data stripe error correction.

Often, storage systems are upgraded to increase storage capacity. Upgrades typically include adding more disks to a storage system. When disks are added to the storage system, the storage system migrates (e.g., moves) some data from portions of present disks ("source disks") to the disks being added. This migration is preferably performed in such a manner to ensure that fault tolerance features of the storage system are maintained and that the performance of striping is enhanced.

Prior migration techniques of storage systems typically used software to store progress information regarding the migration process. In such techniques, a migration pointer may be used to maintain data consistency between the source disks and the newly added disks. For example, as a block of data is migrated from a source disk to a new disk, the migration pointer maintains information about the progress of migration. Based on such a migration pointer, the storage controller could process I/O requests that required access only to portions of the volume for which the migration has completed. However, prior migration techniques using software methods are susceptible to data loss when, for example, power is removed. In the event of a power outage, volatile computer memory loses information about the migration pointer.

To counter the effects of power outages, some migration techniques have been improved by employing Non-Volatile memory devices that maintain progress information about the migration through power loss. Once power is restored after a power outage, migration resumes from a location determined upon reading the migration pointer from Non-Volatile memory. One example of Non-Volatile memory includes Non-Volatile Random Access Memory ("NVRAM").

NVRAM, while useful in storing and recovering migration information, has its own drawbacks. An implementation of NVRAM into a storage system unnecessarily complicates the storage system because, among other reasons, the NVRAM is not easily shared by multiple storage controllers. Some storage systems include multiple storage controllers to improve performance, reliability or both. It is therefore useful to store migration pointer information on other Non-Volatile memory devices that are more easily shared. For example, the migration pointer may be stored on the disk drives of the storage system. However, frequent updates to such a pointer waste valuable disk communication bandwidth.

It is evident from the above discussion that there is an ongoing need to provide improved methods and structures for storage migration related to capacity increases that maintain tolerance to power losses and/or other migration interruptions.

SUMMARY OF THE INVENTION

The present invention solves the above and other problems and advances the state of the useful arts by providing systems and methods for migrating data in a storage system. More specifically, the present invention assists in increasing capacity to the storage system by migrating data blocks of present disks into newly implemented disks providing increased capacity to the storage system. Further, the invention provides these features in a way that is both tolerant of interruptions, such as power, loss and efficient with respect to disk channel bandwidth utilization.

In one exemplary preferred embodiment of the invention, a disk migration system migrates data blocks from the disk drives of the storage volume as earlier configured to data blocks of the newly configured volume with additional capacity. For example, a striped storage system (e.g., RAID0) can increase capacity by adding another disk. Features of the present invention, thus, include migration of data blocks of the present disk(s) onto the newly added disk and onto other locations of the present disk(s).

It should be noted that the disk migration system may migrate data blocks through any transition of disk management and geometry that in effect adds storage capacity. For example, the disk migration system may migrate data blocks when adding a disk to any striped storage system or when transitioning from a first RAID level to another RAID level with less redundancy information. In such a RAID level to RAID level transition, storage space previously used for redundancy information may be re-allocated for data storage, thereby increasing capacity. As particular examples, a RAID1 system (mirrored redundancy) may be transitioned to a RAID0 system (no redundancy) and a RAID6 system (two redundancy portions per stripe) may be transitioned to a RAID5 system (one redundancy portion per stripe). Each such transition has the effect of increasing data storage capacity and hence may benefit from application of the present invention.

In one aspect of the invention, a method of expanding capacity in a storage system includes steps of: configuring data blocks of a first disk with a first progress indicator used to determine correctly migrated data blocks; migrating groups of data blocks among a second disk and the first disk, wherein each group includes a predetermined number of data blocks; and updating a second progress indicator of the first disk in response to completion of migration of each group, wherein an updated said second progress indicator indicates completed said groups of data blocks and wherein the steps of migrating and updating may resume after a migration interruption according to the first progress indicator and to the second progress indicator.

In another aspect of the invention, the step of configuring includes a step of storing a signature in the data blocks of the first disk.

In another aspect of the invention, the step of migrating includes a step of overwriting the signature when one of the data blocks of the second disk migrates to one of the data blocks of the first disk.

In another aspect of the invention, the method further includes a step of resuming migration after the migration interruption according to the first progress indicator and to the second progress indicator.

In another aspect of the invention, the step of resuming includes a step of determining from the second progress indicator one of said groups of data blocks wherein the step of migrating last occurred such that the migration may resume.

In another aspect of the invention, the step of resuming includes a step of comparing the first progress indicator to one of the data blocks of the first disk to determine a correctly migrated data block within said one of said groups of data blocks.

In another aspect of the invention, the step of updating the second progress indicator includes a step of updating a first counter after all of the data blocks of one of said groups of data blocks migrates to the first disk.

In another aspect of the invention, the step of updating the second progress indicator includes a step of updating a second counter to backup the first counter.

In one aspect of the invention, a storage system includes: a first storage disk having data blocks; and a second storage disk communicatively connected to the first storage disk and having data blocks, wherein the second storage disk includes a first progress indicator configured for determining whether one of the data blocks of the first storage disk has correctly migrated to one of the data blocks of the second storage disk, and a second progress indicator configured for determining whether a group of the data blocks of the first storage disk has completed migrating to the second storage disk, wherein migration of the data blocks can resume in the event of a migration interruption based on the first and the second progress indicators.

In one aspect of the invention, a system for expanding capacity in a storage system includes: a migrator communicatively connected to a first disk and to a second disk and configured for migrating groups of data blocks among the first disk and the second disk, wherein each group includes a predetermined number of data blocks; and an updater communicatively connected to the migrator and configured for updating a first progress indicator of the second disk in response to completion of migration of each group, wherein an updated said first progress indicator indicates completed said groups of data blocks, wherein the migrator is adapted to generate a second progress indicator used to determine correctly migrated data blocks such that the migrator may resume migration of said groups of data blocks after a migration interruption according to the first and the second progress indicators.

In another aspect of the invention, the migrator includes a recovery unit for determining from the first progress indicator one of the groups of the data blocks wherein the migration last occurred such that the migration may resume from that group.

In another aspect of the invention, the system further includes an I/O unit configured for assigning the second progress indicator to data blocks of the second disk, wherein the second progress indicator includes a signature used to determine the correctly migrated data blocks.

In another aspect of the invention, the migrator includes a comparator configured for comparing the signature to one of the data blocks of the second disk to determine one correctly migrated data block within said one of the groups of the data blocks.

In another aspect of the invention, the updater includes a counter configured for incrementing after all of the data blocks of one of said groups of data blocks migrate to the second disk.

In another aspect of the invention, the updater includes a second counter configured for incrementing after all of the data blocks of one of said groups of data blocks migrates to the second disk as a backup to the first counter.

DETAILED DESCRIPTION OF THE DRAWINGS

While the invention is susceptible to various modifications and alternative forms, a specific embodiment thereof has been shown by way of example in the drawings and will herein be described in detail. Those skilled in the art will appreciate that the features described below can be combined in various ways to form multiple variations of the invention. As a result, the invention is not limited to the specific examples described below, but only by the claims and their equivalents.

Figure 1:
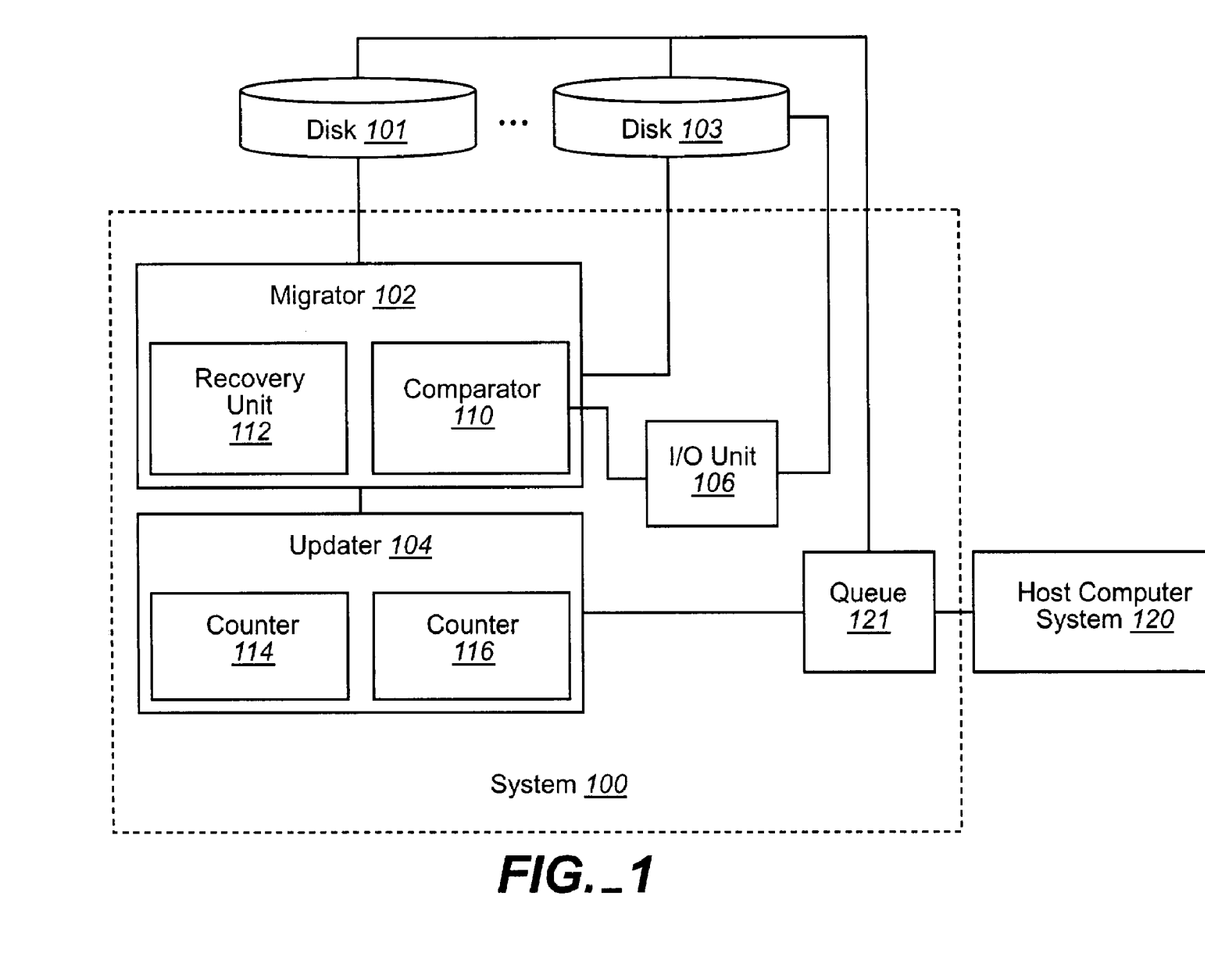
FIG. 1 shows a system in an exemplary preferred embodiment of the invention.

With reference now to the figures and in particular with reference to FIG. 1, an exemplary preferred embodiment of the invention is shown in system 100. System 100 shows exemplary functional elements configured for expanding capacity in a storage system. For example, a storage system can increase storage capacity by adding one or more disks, such as disk 103. Other examples of increasing the storage capacity include migrating data among disks of one RAID level to another RAID level, such as from RAID1 to RAID0. Data blocks (e.g., stripes) of present disk(s), such as disk 101, are migrated among the present disk(s) and the newly added disk(s) for more efficient access to the data. As noted above, newly added disk(s) 103 may be either a new disk physically added or otherwise made newly available for additional capacity. For example, capacity of a volume may be increased by a transition between certain RAID levels though no new disk is physically added to the system. Details of such are described in greater detail herein, particularly in FIGS. 2, 3, and 5.

In one exemplary preferred embodiment of the invention, system 100 includes migrator 102 and updater 104. Migrator 102 is communicatively connected to disk 101 and to disk 103. The disks 101 and 103 may be hard disk drives commonly found in a storage system. Migrator 102 is configured for transferring, or migrating, groups of data blocks among disks 101 and 103. For example, migrator 102 may migrate the data blocks among the disks in a substantially even manner. Each group of the data blocks includes a predetermined number of data blocks. A user may define this predetermined number prior to migration of the data blocks; although, in some embodiments, the predetermined number may be dynamically defined during migration.

Updater 104 is communicatively connected to migrator 102 and configured for updating a first progress indicator stored with disk 103. For example, migrator 102 migrates among disks 101 and 103 all of the data blocks of a particular group; upon migrating all of the data blocks within the particular group, updater 104 updates a first progress indicator. The updated first progress indicator, therefore, indicates a completed migration of the particular group. In the event of a power outage or other interruption, this first progress indicator is useful in determining a particular group in which migration has occurred such that the migration may rapidly resume. Updates of the first progress indicator are described in greater detail in FIG. 2.

In one embodiment of the invention, updater 104 configures sizes of data block groups migrated among disks 101 and 103. For example, if updater 104 configures the group size to be 20 data blocks, then 20 data blocks migrate among disks 101 and 103 before updater 104 updates the first progress indicator. In this example, 10 data blocks may be migrated within disk 101 and ten data blocks within disk 103. Accordingly, the first progress indicator includes a count which can be incremented at each instance of a complete group of data blocks migrated among disks 101 and 103.

In one embodiment of the invention, updater 104 also includes counter 114. Counter 114 is configured for incrementing a count as all of the data blocks of a particular group have migrated among disks 101 and 103. As in the previous example, migrator 102 migrates data blocks among disks 101 and 103 in groups of 20 data blocks. Upon migrating 20 data blocks between disks 101 and 103, counter 114 increments the count of the group to the next 20 data blocks. Counter 114 stores that count in a portion of disk 103 that is unaffected by the migration because, inter alia, disk 103 is a non-volatile memory and not typically susceptible to data loss in the event of a power outage or other migration interruption.

In one embodiment of the invention, updater 104 also includes counter 116 which updates progress of group migration similar to that of counter 114. For example, counter 116 is configured for incrementing a count as all of the data blocks within a group are migrated among disks 101 and 103. Counter 116 may, thus, serve as a backup to counter 114 in the event of a power outage or other migration interruption preventing counter 114 from storing its count with disk 103. Since two counts are stored in disk 103, the probability of indeterminate points at which migration should resume is minimized.

Migrator 102 is also configured to generate a second progress indicator used to determine correctly migrated data blocks such that migrator 102 may resume migration of groups of data blocks after a power outage or other migration interruption according to the first and the second progress indicators. An I/O unit 106 is configured for pre-configuring data blocks of disk 103 with the second progress indicator. For example, the second progress indicator may include a signature that I/O unit 106 inputs into each of the data blocks of disk 103 tagged for migration. This signature may be a unique code, such as invalid data, stored in the data block. As migrator 102 migrates data blocks from disk 101 to disk 103 the signatures are overwritten with the data blocks from disk 101. However, in the event of a power outage, the unique code of the signature can be compared to data blocks of the disk 103 to determine which data blocks were properly overwritten.

To perform a comparison of the unique code to the signature stored in the data block, migrator 102 includes comparator 110 in one embodiment of the invention. Comparator 110 is configured for reading the data block of the disk 103 and comparing the data of that data block to the unique code of the signature. If the unique code of the signature does not match that which is stored in the data block of disk 103, comparator 110 determines that the data block of disk 103 was successfully filled with a data block of disk 101.

In one embodiment of the invention, migrator 102 includes recovery unit 112 configured for determining a point wherein migration last occurred in the event of a power outage or other migration interruption. For example, recovery unit 112 accesses, from disk 103, the counts generated by counters 114 and 116 to determine which group of data blocks migrator 102 was last migrating. Once the recovery unit 112 determines the appropriate group, recovery unit 112 retrieves the comparison from comparator to determine which data block within that group was last successfully migrated. Accordingly, recovery unit 112 uses the first and second progress indicators to determine the last data block that migrator 102 successfully migrated from disk 101 to disk 103.

In one embodiment of the invention, recovery unit 112 determines that migration should resume from the data block prior to the last successfully migrated data block in the event that a power outage or other migration interruption occurred during a point at which migrator 102 was overwriting the second progress indicator of a block of disk 103. For example, as migrator 102 migrates a data block from disk 101 to disk 103, migrator 102 overwrites the second progress indicator within the data block of disk 103. If a power outage or other migration interruption occurs during that overwrite, migrator 102 may overwrite a portion of the second progress indicator such that a comparison by comparator 110 does not match. Thus, comparator 110 may determine that the data block with a partially overwritten second progress indicator is the last successfully migrated data block. By using the data block prior to that partially overwritten data block, recovery unit 112 can resume migration from a more definite successfully migrated data block.

In one embodiment of the invention, portions of disks 101 and 103 in which data has already migrated can be accessed during migration of the remaining portions of disks 101 and 103. For example, a host computer system 120 may access already migrated portions of disks 101 and 103 via I/O requests while migration continues onto unaffected portions of those disks. Queue 121 may queue the I/O requests during migration of data blocks and process them after migration of the data blocks. In one embodiment the I/O requests are processed in between periods of migrations of the groups of data blocks.

Figure 2:
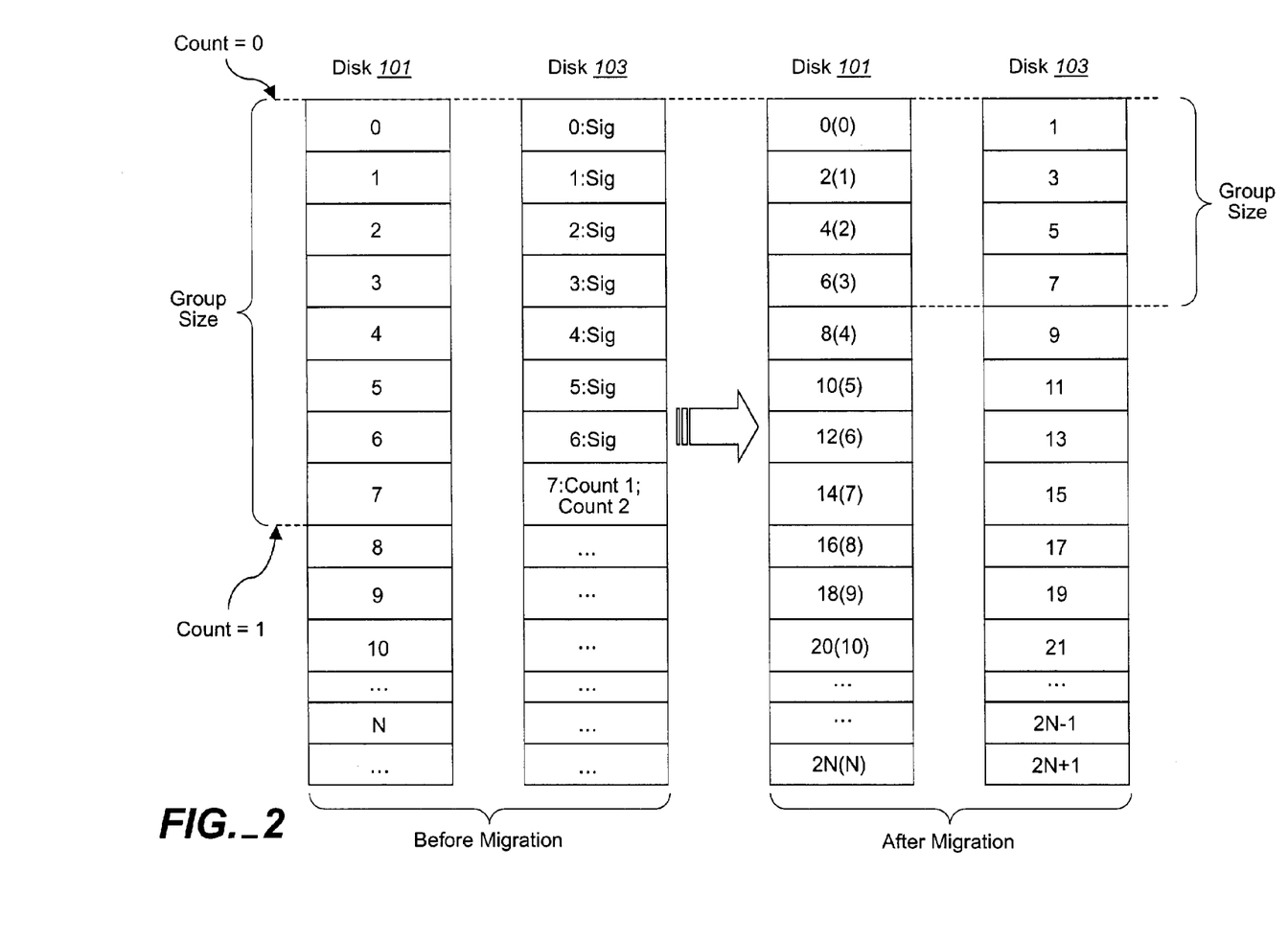
FIG. 2 illustrates a migration of data blocks in an exemplary preferred embodiment of the invention.

FIG. 2 illustrates data blocks of disk 101 being migrated among disks 101 and 103 in one exemplary preferred embodiment of the invention. Disk 101 is shown before migration as having data blocks 0, 1, . . . N, where N is an integer. Also before migration, I/O unit 106 pre-configures disk 103 with signatures in data blocks 0:Sig through 6:Sig. In a preferred embodiment of the invention, disks 101 and 103 have a same total number of data blocks.

In one example, for illustrative purposes, the size of the group is established at eight data blocks. In this example, migrator 102 begins migrating data block 0 of disk 1 at count=0 (e.g., where migration first begins) according to following migration cycles.

Migration Cycle 0

Migrator 102 reads data block 1 of disk 101 and writes the information of that data block in data block 0:Sig of disk 103 (e.g., shown as data block 1 of disk 103 after migration).

Migration Cycle 1

Migrator 102 then reads data blocks 2 and 3 of disk 101 and writes data block 2 to the data block previously occupied by data block 1 of disk 101 (e.g., shown as data block 2(1) of data block 101 after migration). Migrator 102 also writes the information of data block 3 in 1:Sig of disk 103 (e.g., shown as data block 3 of disk 103 after migration).

Migration Cycle 2

Migrator 102 then reads data blocks 4 and 5 of disk 101 and writes data block 4 to the data block previously occupied by data block 2 of disk 101 (e.g., shown as data block 4(2) of data block 101 after migration). Migrator 102 also writes the information of data block 5 in 2:Sig of disk 103 (e.g., shown as data block 5 of disk 103 after migration).

Migration Cycle 3

Migrator 102 then reads data blocks 6 and 7 of disk 101 and writes data block 6 to the data block previously occupied by data block 3 of disk 101 (e.g., shown as data block 6(3) of data block 101 after migration). Migrator 102 also writes the information of data block 7 in 3:Sig of disk 103 (e.g., shown as data block 7 of disk 103 after migration).

Upon completion of migration cycle 3, updater 104 updates the first progress indicator to count=1. In doing so, counts 1 and 2 from respective counters 114 and 116 are updated to reflect the new count. Accordingly, migrator 102 begins migration from a new group beginning at count=1. Migration would proceed in this manner until migration among disks 101 and 103 is complete.

In the event of a power outage or other migration interruption, recovery unit 112 accesses counts 1 and 2 to determine the group in which migration was previously occurring. For example, if migration is interrupted during Migration Cycle 2, recovery unit 112 accesses counts 1 and 2 upon return from the interruption. Recovery unit 112 then determines that migration previously occurred in the group where count=0. Accordingly, recovery unit 112 searches the group for the last successfully migrated data block of disk 103 (e.g., the last data block successfully migrated from disk 101 to disk 103).

To determine the last data block that was successfully migrated from disk 101 to disk 103, comparator 110 reads the data blocks of the group (e.g., where count=0) and compares the unique code of the signature to each of the data blocks within the group. If comparator 110 compares the unique code to a particular data block of the group and determines there is no difference, comparator 110 generates a comparison for recovery unit 112 such that recovery unit 112 determines that the particular data block is one in which data has not migrated. Alternatively, if comparator 110 compares the unique code to a particular data block of the group and determines there is a difference, comparator 110 generates a comparison for recovery unit 112 so that recovery unit 112 determines that the particular data block is one in which data has migrated.

In one embodiment, recovery unit 112 determines that the data block of disk 103 immediately adjacent the particular data block is the data block in which migration should resume. For example, if a power outage or other migration interruption occurs during an overwrite of the signature in the particular data block, the signature will not match that of the unique code, although migration is not completely successful for that particular data block. By resuming migration from the data block immediately adjacent the particular data block, the previous point of migration may be substantially assured. Such determinations may not be necessary for locating previous points of successful migration in disk 101 as data blocks should remain in tact until they are overwritten by some location multiple of the data block (e.g., past the point of successful migration). For example, data block 7 of disk 101 is not overwritten with migrated data of disk 101 until migration reaches data block 14 (e.g., as shown in data block 14(7) of disk 101 after migration).

One example of this migration may occur in a RAID0 to RAID0 migration in which disk 103 is added to increase the storage capacity of the RAID0 storage system. Additionally, this example may prove useful in a RAID1 to RAID0 migration. This example, however, is intended to illustrate one type of migration when capacity of the storage system is increased. Other types of migration may also fall within the scope of the invention. Another such migration is shown and described in FIG. 5.

Figure 3:
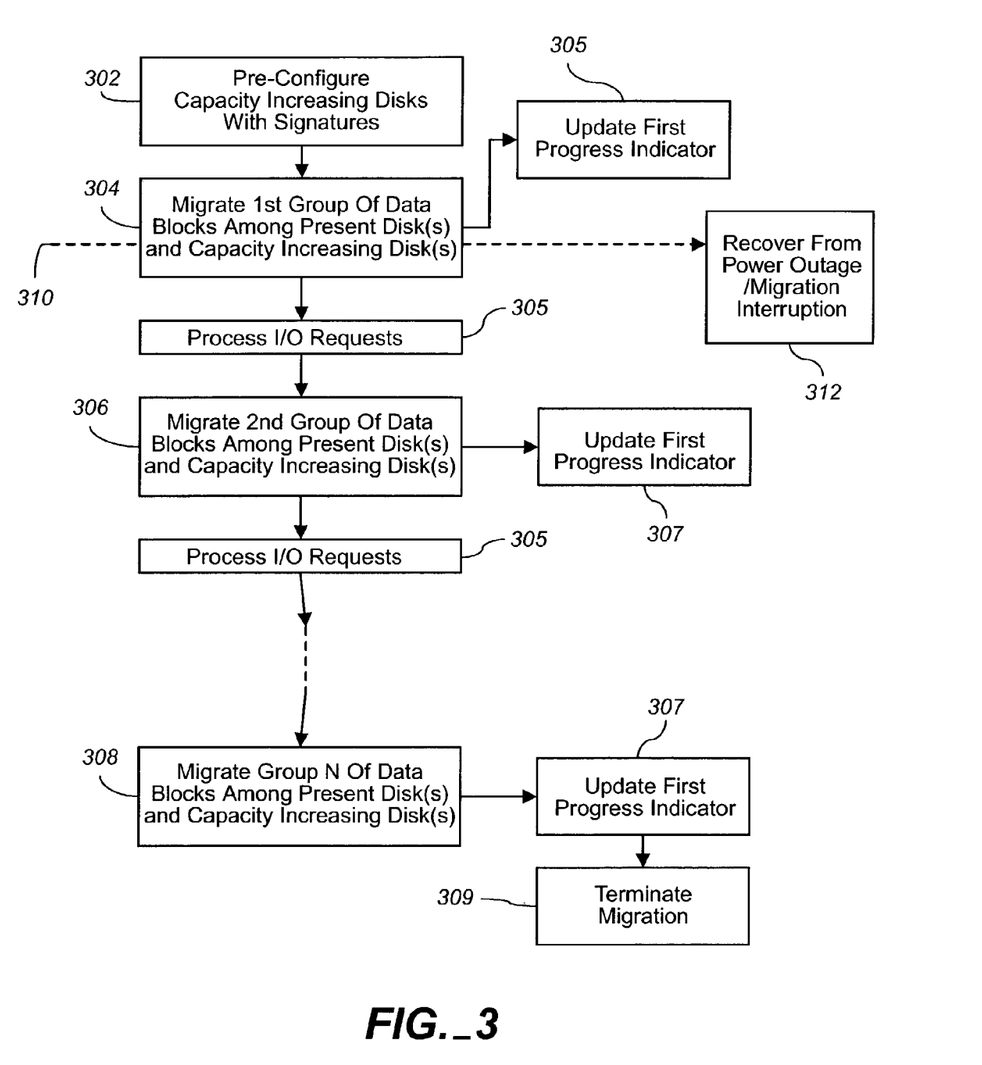
FIG. 3 shows a block diagram illustrating steps involved with migration in an exemplary preferred embodiment of the invention.

FIG. 3 shows a block diagram illustrating steps involved with migration in an exemplary preferred embodiment of the invention. When capacity increasing disk(s), such as disk 103, are added to a storage system to increase capacity, I/O unit 106 configures data blocks of the disk(s) with signatures in step 302. These signatures typically include invalid data (e.g., data that is unique, yet typically unrecognizable, when accessed by a host computer system such as host computer system 120). Once the data blocks of the capacity increasing disks are configured, migrator 102 begins migrating groups of data blocks among present disk(s) and the capacity increasing disk(s) (e.g., disks 101 and 103). Migration of the groups of data blocks may be performed in a manner described in FIG. 2. Once migrator 102 completely migrates a first group of data blocks among the present disk(s) and the capacity increasing disk(s) in step 304, updater 104 updates a progress indicator in step 307. For example, once migrator 102 migrates all of the data blocks of a particular group (e.g., the group between count=0 and count=1 of FIG. 2), updater 104 updates the progress indicator to indicate migration is to begin at a new group (e.g., count=0 is updated to count=1).

In one exemplary preferred embodiment of the invention, I/O requests to the data blocks are processed from queue in between migrations of groups of data blocks in step 305. I/O requests can be processed to the data blocks on either of the present or capacity increasing disk(s) since migration is in between migration groups. In another embodiment of the invention, I/O request are processed in between migration cycles, such as those mentioned in FIG. 2.

Migrator 102 resumes migration with the second group of data blocks in step 306. Migration of the second group of data blocks is similar to that of the first group of data blocks in step 304. Once migrator 102 migrates the second group of data blocks, updater 104 again updates the progress indicator in step 307. Migrator 102 continues migrating groups of data blocks among the present disk(s) and the capacity increasing disk(s) until all groups and all data blocks of the present disk(s) migrate among the present disk(s) and the capacity increasing disk(s) (e.g., group N of data blocks migrate among disks 101 103 in step 308). After migrating the last group of data blocks, updater 104 updates the first progress indicator in step 307 and determines that the last group of data blocks has migrated. Accordingly, updater 104 terminates migration when there are no longer data blocks to migrate in step 309.

Also shown in FIG. 3 is line 310 indicating a time when a power outage or other migration interruption may occur. For example, a power outage may occur during migration step 304 as migrator 102 migrates data blocks among present disk(s) and capacity increasing disk(s). Before migration is resumed, recovery unit 112 determines the point at which migration last occurred. Migration recovery, thus, begins at step 312 and is discussed below in FIG. 4. It should be noted that migration recovery can occur at any point during migration and is not limited to line 310 as shown in the exemplary embodiment.

Figure 4:
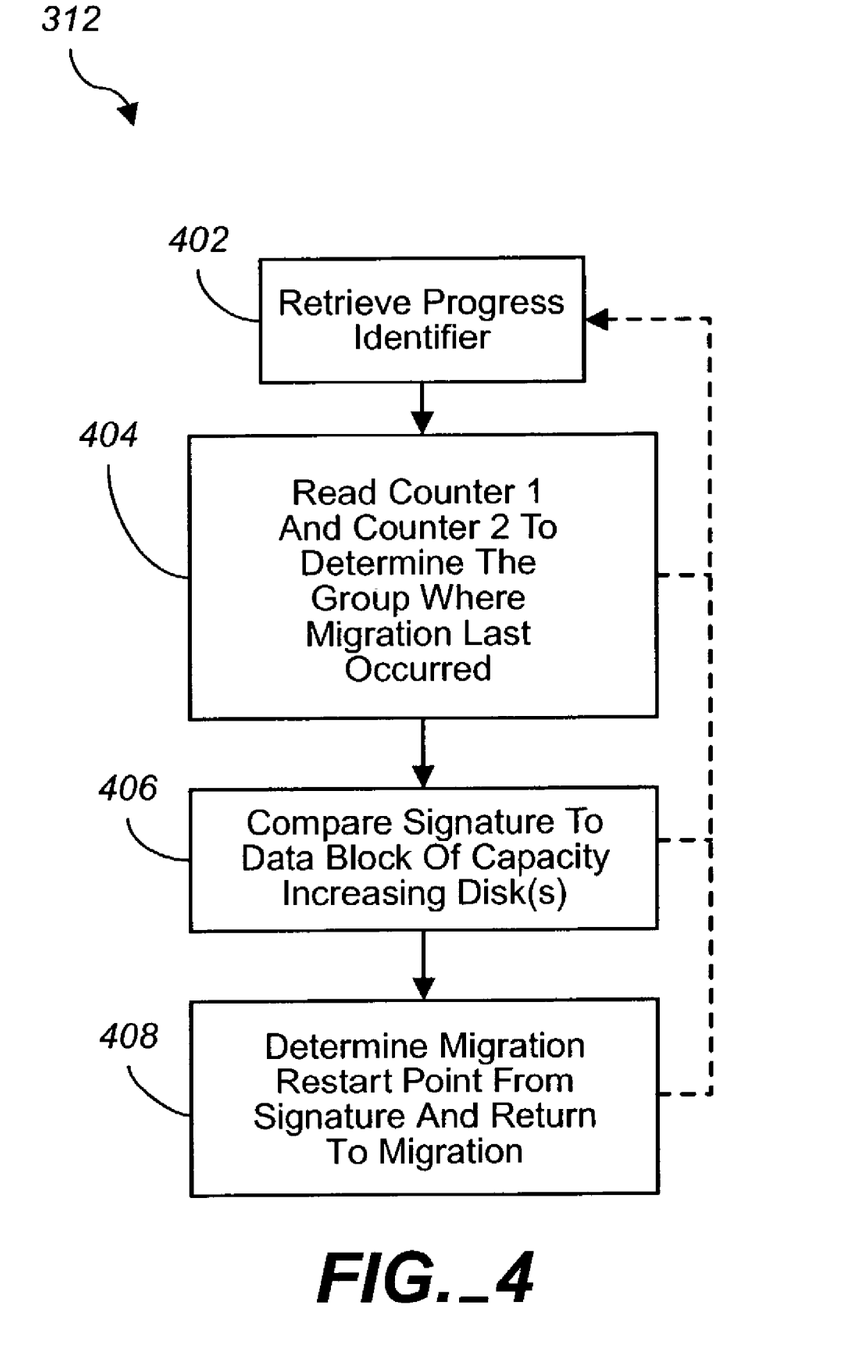
FIG. 4 shows a block diagram illustrating steps involved with migration recovery in an exemplary preferred embodiment of the invention.

FIG. 4 shows a block diagram illustrating steps involved with migration recovery in an exemplary preferred embodiment of the invention. For example, migration recovery step 312 includes step 402 wherein recovery unit 112 retrieves the first progress indicator from the capacity increasing disk(s). From the first progress indicator, recovery unit 112 reads counts 1 and 2, such as those generated by counters 114 and 116 of FIG. 1, to determine the group where migration last occurred in step 404.

Comparator 110 compares a unique code of a signature to the data blocks of that group in step 406. For example, data blocks of the capacity increasing disks are pre-configured with a signature that may include a bit pattern of invalid data. Comparator 110 compares that bit pattern to the data blocks of the capacity increasing disk(s) to determine if a data block was overwritten with migrated data of present disk(s). If the data block was not overwritten, then the bit pattern will match the signature of the data block and comparator 110 determines that the data block under comparison is not one in which migration last occurred. If the data block was overwritten, then the bit pattern will not match and comparator 110 determines that the data block was a successfully migrated data block. In some instances, a power outage or other migration interruption can occur during an overwrite of the signature in the data block. Accordingly, comparator 110 may generate information for recovery unit 112 indicating that migration should begin at a data block with a non-matching signature immediately adjacent the data block being compared with the non-matching signature. As such, comparator 110 may more assuredly determine a point at which migration last occurred.

Recovery unit 112 receives the information indicating the last successfully migrated data block and determines, in combination with the first progress indicator (e.g., counts 1 and 2), a point where migration should resume in step 408. If another power outage or other migration interruption occurs at any point during recovery, recovery unit may return to step 402.

Advantages of this method of recovery include fewer reads from capacity increasing disk(s) compared to that of prior systems. For example, since data is migrated in groups, recovery unit 112 determines the group where migration last occurred and only searches for the last migrated data block within that group. Prior systems, as previously stated, determine a point where migration last occurred by frequently updating a migration pointer after each data block is migrated to the capacity increasing disk(s). These frequent updates of the prior systems waste valuable disk communication bandwidth.

Figure 5:
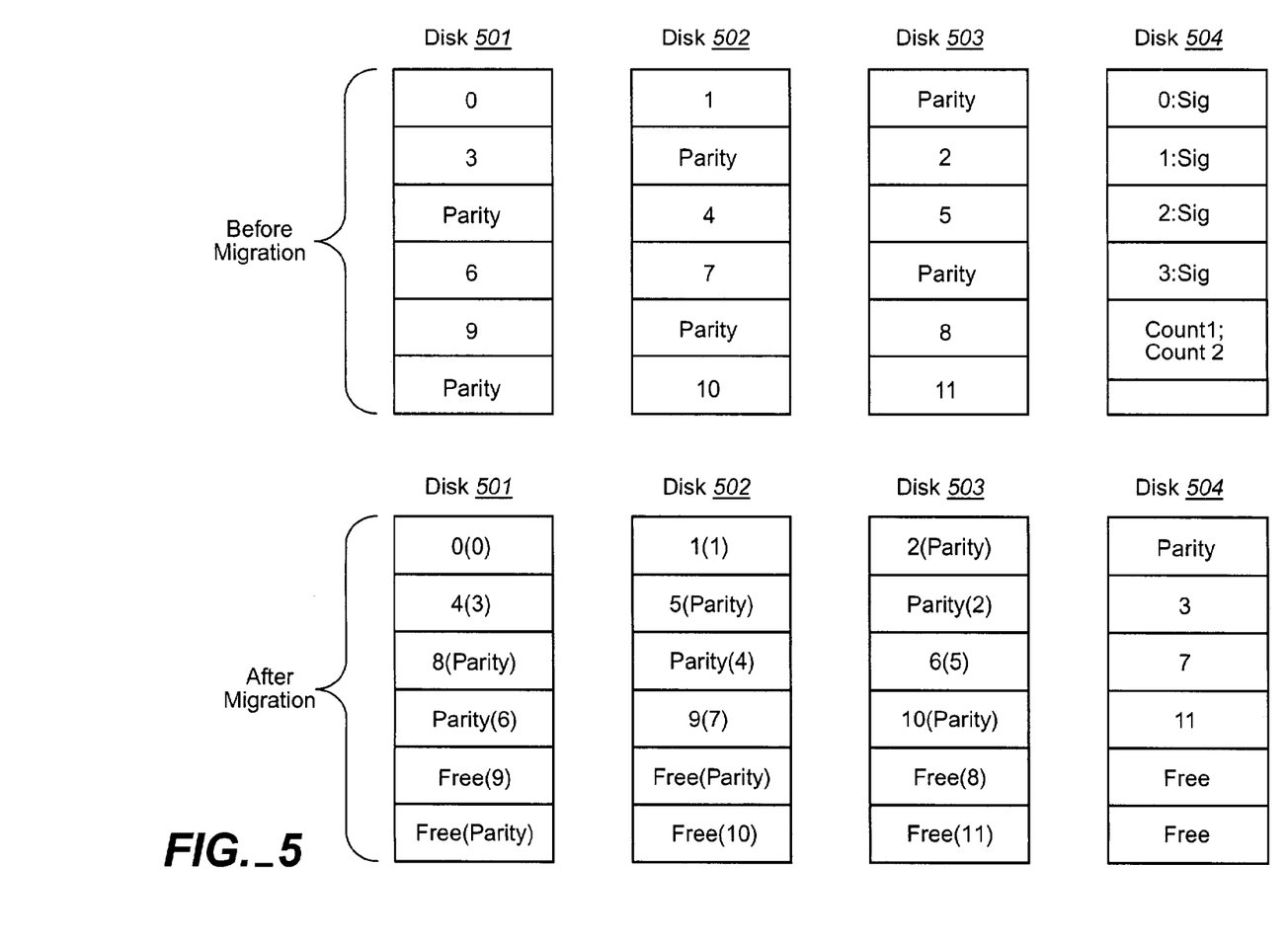
FIG. 5 illustrates another migration of data blocks in an exemplary preferred embodiment of the invention.

FIG. 5 illustrates data blocks of multiple disks (e.g., disks 501, 502, and 503) being migrated to disk 504 in one exemplary preferred embodiment of the invention. Such a migration may be similar to that of a RAID6 system migration to a RAID5 system wherein disk 504 is a former redundant parity disk being overwritten with data blocks of disks 501, 502, and 503 to increase capacity. Alternatively, the migration may be similar to a RAID5 system wherein disk 504 is being added to the RAID5 system to increase capacity.

FIG. 5 illustrates migration in two views, before migration and after migration. In this embodiment, data blocks of disk 504 are pre-configured with the signatures 0:Sig . . . 3:Sig and counts 1 and 2. A migrator, such as migrator 102 of FIG. 1, migrates data blocks of disks 501, 502, and 503 among each of disks 501, 502, 503 and 504. After migration, data blocks of disks 501, 502, and 503 are shown with present data block numbers beside previous data block numbers (e.g., previous data block numbers are in parentheses). To illustrate, the migrator migrates a parity data block of disk 503 to disk 504 thereby overwriting 0:Sig. Afterwards, the migrator migrates data block 2 to the position previously occupied by the parity data block of the disk 503, and data blocks 3, 7, and 11 to data blocks 1:Sig, 2:Sig, and 3:Sig of disk 504, respectively.

Migration then continues with the migrator migrating remaining data blocks within disks 501, 502, and 503 until data is compacted. This migration, as shown, illustrates one manner in which the migrator would migrate a group of data blocks among disks 501, 502, 503 and 504. Accordingly, after migration of the group is complete, an updater, such as updater 104 of FIG. 1, updates the first progress indicator such that counts 1 and 2 are updated. Should a power outage or other migration interruption occur during the migration, a recovery unit, such as recovery unit 112 of FIG. 1, would recover the point at which migration last occurred (e.g., the last successfully migrated data block within the group). Recovery methods may be similar to those discussed above.

The invention is not intended to be limited to the exemplary migration techniques shown in FIGS. 2 and 5. Other methods of migration of data blocks from among disks 501, 502, 503, and 504 may fall within the scope of the invention. Additionally, the invention is not intended to be limited to the number of disks, either those present or those increasing capacity, or the number of data blocks illustrated in the exemplary embodiments.

Advantages of the system include improved migration recovery in the event of a power outage or other migration interruption as storage capacity is added to a storage system. Other advantages include a decrease in the number of accesses to newly added disk(s) when recovering from such a power outage or other migration interruption.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method of expanding capacity in a storage system, comprising steps of:
   configuring data blocks of a first disk with a first progress indicator used to determine correctly migrated data blocks;
   migrating groups of data blocks between a second disk and the first disk, wherein each group comprises a predetermined number of data blocks; and updating a second progress indicator of the first disk in response to completion of migration of each group, wherein an updated said second progress indicator indicates completion of migration of said groups of data blocks and wherein the steps of migrating and updating may resume after a migration interruption according to the first progress indicator and to the second progress indicator.

2. The method of claim 1, wherein the step of configuring further comprises a step of storing a signature in the data blocks of the first disk.

3. The method of claim 2, wherein the step of migrating further comprises a step of overwriting the signature when one of the data blocks of the second disk migrates to one of the data blocks of the first disk.

4. The method of claim 1, wherein the step of resuming further comprises a step of determining from the second progress indicator one of said groups of data blocks wherein the step of migrating last occurred such that the migration may resume.

5. The method of claim 4, wherein the step of resuming further comprises a step of comparing the first progress indicator to one of the data blocks of the first disk to determine a correcfly migrated data block within said one of said groups of data blocks.

6. The method of claim 1, wherein the step of updating the second progress indicator further comprises a step of updating a first counter after all of the data blocks of one of said groups of data blocks migrates to the first disk.

7. The method of claim 6, wherein the step of updating the second progress indicator further comprises a step of updating a second counter to backup the first counter.

8. A storage system, comprising:
a first storage disk having data blocks; and
a second storage disk communicatively connected to the first storage disk and having data blocks, wherein the second storage disk comprises
   a first progress indicator configured for determining whether one of the data blocks of the first storage disk has correctly migrated to one of the data blocks of the second storage disk, and
   a second progress indicator configured for determining whether a group of the data blocks of the first storage disk has completed migrating to the second storage disk, wherein migration of the data blocks can resume in the event of a migration interruption based on the first and the second progress indicators.

9. A system for expanding capacity in a storage system, comprising:

a migrator communicatively connected to a first disk and to a second disk and configured for migrating groups of data blocks between the first disk and the second disk, wherein each group comprises a predetermined number of data blocks;

a first progress indicator indicative of miaration of data blocks within groups:

a second progress indicator indicative of migration of groups; and an updater communicatively connected to the migrator and configured for updating the second progress indicator in response to completion of migration of each group, wherein an updated said second progress indicator indicates the completed migration of said groups of data blocks, wherein the migrator is adapted to update the first progress indicator used to determine correctly migrated data blocks such that the migrator may resume migration of said groups of data blocks after a migration interruption according to the first and the second progress indicators.

10. The system of claim 9, wherein the migratory further comprises a recovery unit for determining from the second progress indicator one of the groups of the data blocks wherein the migration last occurred such that the migration may resume from that group.

11. The system of claim 9, further comprising an I/O unit configured for assigning the first progress indicator to data blocks of the second disk, wherein the first progress indicator includes a signature used to determine the correctly migrated data blocks.

12. The disk migration system of claim 11, wherein the migratory further comprises a comparator configured for comparing the signature to one of the data blocks of the second disk to determine one correctly migrated data block within said one of the groups of the data blocks.

13. The system of claim 9, wherein the updater further comprises a counter configured for incrementing after all of the data blocks of one of said groups of data blocks migrate to the second disk.

14. The system of claim 13, wherein the updater further comprises a second counter configured for incrementing after all of the data blocks of one of said groups of data blocks migrates to the second disk as a backup to the first counter.

* * * * *